US012705108B2

(12) United States Patent
Chajdas et al.

(10) Patent No.: US 12,705,108 B2
(45) Date of Patent: Aug. 11, 2026

(54) HARDWARE-ACCELERATED ATOMIC DATA STRUCTURES

(71) Applicant: ADVANCED MICRO DEVICES, INC., Santa Clara, CA (US)

(72) Inventors: Matthaeus G. Chajdas, Munich (DE); Christopher J. Brennan, Boxborough, MA (US); Dominik Joerg Baumeister, Munich (DE); Fabian Robert Sebastian Wildgrube, Mönkeberg (DE); John Stephen Junkins, Bend, OR (US); Nicolai Haehnle, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/397,222

(22) Filed: Dec. 27, 2023

(65) Prior Publication Data

US 2025/0217203 A1 Jul. 3, 2025

(51) Int. Cl.

| | |
|---|---|
| ***G06F 9/52*** | (2006.01) |
| ***G06F 9/48*** | (2006.01) |
| ***G06F 9/50*** | (2006.01) |

(52) U.S. Cl.

CPC .......... *G06F 9/5055* (2013.01); *G06F 9/4881* (2013.01)

(58) Field of Classification Search

None

See application file for complete search history.

(56) References Cited

U.S. PATENT DOCUMENTS

| | | | | |
|---|---|---|---|---|
| 9,875,139 | B2 * | 1/2018 | Rafique | G06F 9/5077 |
| 10,109,030 | B1 * | 10/2018 | Sun | G06T 1/20 |
| 11,221,979 | B1 * | 1/2022 | Borkovic | G06F 13/28 |
| 11,294,708 | B2 * | 4/2022 | Bang | G06F 9/5077 |
| 11,698,869 | B1 * | 7/2023 | Kulkarni | G06F 12/1458 711/163 |
| 2010/0268791 | A1 * | 10/2010 | Arimilli | G06F 9/4843 709/217 |
| 2014/0181828 | A1 * | 6/2014 | Bird | G06F 9/5066 718/103 |
| 2014/0181833 | A1 * | 6/2014 | Bird | G06F 9/5077 718/105 |
| 2019/0155660 | A1 * | 5/2019 | McQuighan | G06F 9/5022 |

* cited by examiner

*Primary Examiner* — Michael Sun

(57) ABSTRACT

A processor includes an accelerated access circuit, a data structure, and a hardware scheduler. The data structure is managed by software and bound to the accelerated access circuit. The hardware scheduler is configured to schedule, on the accelerated access circuit, a work item requesting access to the data structure. The accelerated access circuit is configured to receive a request from the work item to access the data structure. Responsive to the request, the accelerated access circuit is further configured to serialize access by the work item to the data structure thereby preventing other work items from accessing the data structure.

20 Claims, 5 Drawing Sheets

HARDWARE-ACCELERATED ATOMIC DATA STRUCTURES

BACKGROUND

As the computational demands of applications have grown, so too have the complexities and responsibilities of processing units, such as central processing units (CPUs), graphics processing units (GPUs), accelerated processing units, co-processors, and the like. For example, a CPU, being a general-purpose processor, handles a variety of tasks including system control, arithmetic computations, and data management. On the other hand, a GPU is optimized for tasks that require parallel processing, such as rendering graphics and handling complex simulations. The proficiency and performance of processing units are inextricably tied to their methods for accessing various data structures, which serve as foundational elements in computing systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
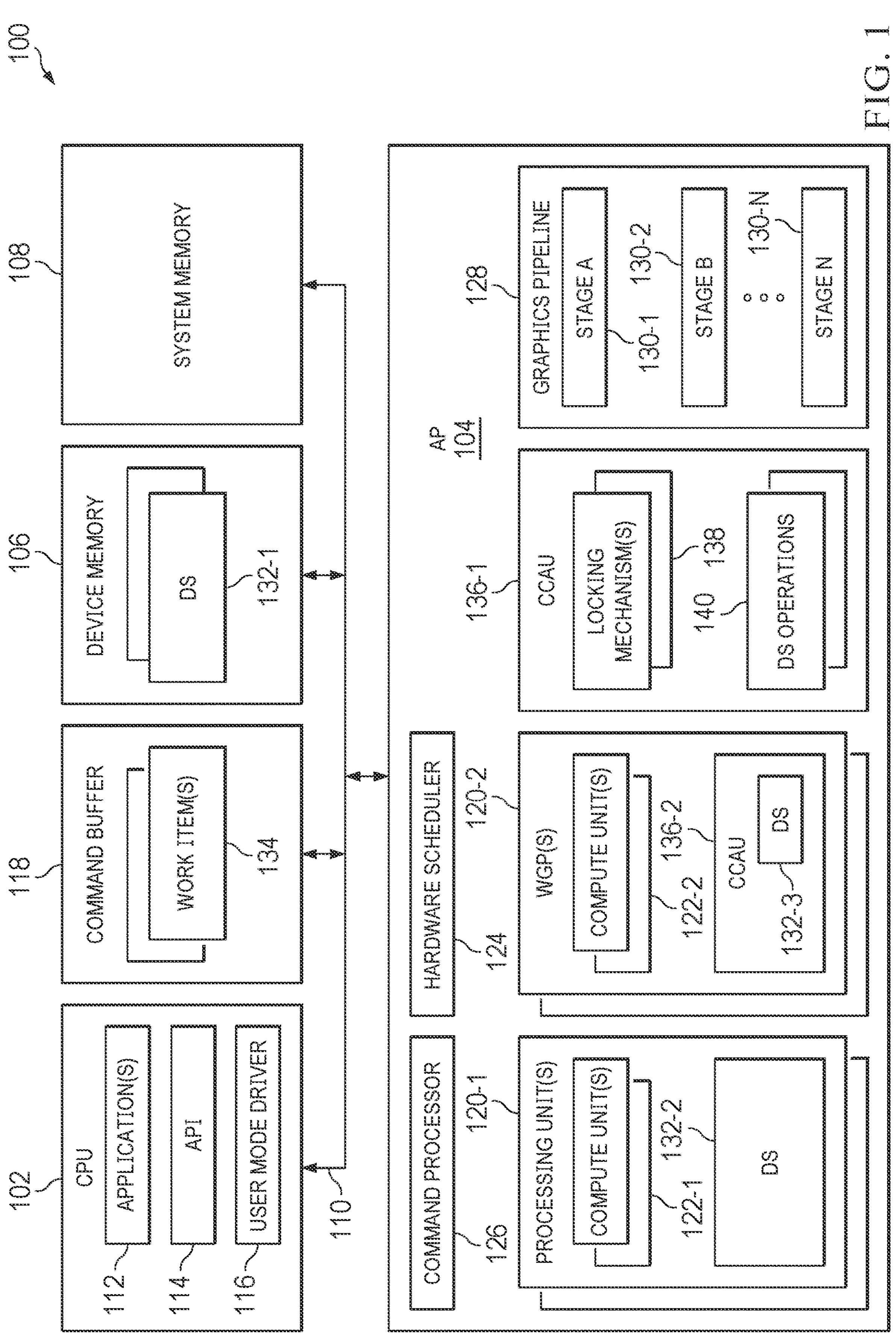
FIG. 1 is a block diagram of an example processing system implementing hardware-accelerated access to software-managed data structures in accordance with some implementations.

Data structures are organizational schemes that allow for the efficient manipulation, storage, and access of data. The efficient operation of a processing unit in a computing system is dependent on its ability to quickly access and manipulate data stored in a variety of data structures. One type of data structure is a software-managed data structure. Software-managed data structures organize and store data in a computing system that is typically managed through software instructions. Unlike hardware-managed data structures, which are controlled by specialized hardware circuits, software-managed data structures are implemented and manipulated using programming code executed by a processor, such as a CPU, GPU, accelerated processor, or the like. Examples of software-managed data structures include buffers, linked lists, hash tables, arrays, and the like.

The way software-managed data structures are accessed and modified when multiple threads are involved can have a significant impact on the system's performance and reliability. For example, in multi-threading or multi-core environments, software-managed data structures are typically accessed by processes using one or more locking mechanisms to manage issues such as data corruption, race conditions, or deadlocks. When a data structure is locked, other threads attempting to access the data structure must wait until the lock is released. While this ensures data consistency, locking mechanisms also introduce latency and the possibility of deadlock if not managed carefully. Also, managing locks consumes processor resources, and as the number of threads increases, so does the complexity and overhead of managing locks, which affects the system's scalability.

To improve system performance when accessing software-managed data structures, FIG. 1 to FIG. 5 illustrate systems and methods for accelerating access to these data structures by utilizing hardware units (referred to herein as "complex compound atomic hardware units (CCAUs)" or "accelerated access circuits") that serialize and rate limit access to the data structures. As described below, a software-managed data structure (herein referred to as "data structure"), such as a buffer, linked list, hash table, or the like, is bound to a CCAU. Stated differently, the data structure has a one-to-one mapping with a CCAU, although a single CCAU is able to be bound to multiple data structures (i.e., a one-to-N mapping). In at least some implementations, various mechanisms can be used to bind a data structure to a CCAU. For example, a data structure is bound to a specified CCAU by configuring a hardware scheduler to only issue tasks, threads, or instructions requiring access to the data structure to a single specified CCAU associated with the data structure. In some implementations, a data structure is implemented external to the CCAU. In other implementations, a data structure is implemented internally within the CCAU, which also binds the data structure to the CCAU.

When a work item (e.g., a task, thread, wavefront, warp, instruction, or the like) of a program attempts to access a software-managed data structure, a hardware scheduler schedules the work item for execution on the CCAU. Once scheduled, the work item issues a request to the CCAU for accessing the software-managed data structure bound to the CCAU. In at least some implementations, the request encapsulates one or more commands or instructions that the work item is requesting to be performed on the data structure. The CCAU, in at least some implementations, includes an internal locking or serialization mechanism. When the CCAU receives the request from the work item, the CCAU sets the locking mechanism and notifies the hardware scheduler that a lock has been set (or obtained). This lock notification indicates to the hardware scheduler that the CCAU is currently busy and the hardware scheduler refrains from scheduling any additional work items at the CCAU until the lock is released. Stated differently, additional work items are blocked from accessing the CCAU until the lock is released. Therefore, the CCAU rate limits the computational threads by setting the locking mechanism.

After the CCAU sets the locking mechanism, the CCAU performs the operations requested by the work item on the data structure in a serialized or atomic manner. Stated differently, the operations requested by the work item are executed and completed by the CCAU before another work item is allowed access to the CCAU. In at least some implementations, the CCAU completes the operations within one clock cycle or multiple clock cycles. The CCAU, in at least some implementations, is configured to execute operations associated with a single type of data structure. In other implementations, the CCAU is configured to execute operations associated with a plurality of different types of data structures. For example, in implementations where the CCAU is bound to either a single internal data structure, a single external data structure, or multiple data structures of the same type, the CCAU is configured to execute operations for that data structure (or type of data structure). However, in implementations where the CCAU is bound to either multiple internal data structures of different types, multiple external data structures of different types, or a combination thereof, the CCAU is configured to execute multiple different sets of operations.

After the CCAU has completed executing the operations on the data structure, the CCAU performs a return operation that returns data from the data structure to the work item, sends a notification to the work item that the requested operations have been completed, or a combination thereof depending on the request received from the work item. In at least some implementations, the CCAU performs the return operation using one or more return paths, such as direct memory access (DMA) writes, hardware registers, message queues, interrupts, shared memory writes, status flags, callbacks, a combination thereof, or the like. The CCAU also releases or resets its locking mechanism and notifies the hardware scheduler that the lock has been released. In response to receiving this notification from the CCAU, the hardware scheduler selects and schedules another computation unit to access the CCAU.

As such, the CCAU accelerates access to software-managed data structures, such as buffers, linked lists, and hash tables, by removing the need for work items to acquire locks or perform atomic operations. For example, instead of the work items having to perform atomic operations or obtain and release locks, which can be computationally expensive, to access a software-managed data structure, the work items only need to send a request to the CCAU. When the CCAU receives a request from a work item to access a data structure bound to the CCAU, the CCAU serializes access to the data structure by blocking any other work items from accessing the data structure. The CCAU then performs the requested operations on the data structure in a serialized or atomic manner.

FIG. 1 is a block diagram illustrating a processing system 100 implementing software-managed data structures that are accelerated by hardware in accordance with some implementations. It is noted that the number of components of the processing system 100 varies from implementation to implementation. In at least some implementations, there is more or fewer of each component/subcomponent than the number shown in FIG. 1. It is also noted that the processing system 100, in at least some implementations, includes other components not shown in FIG. 1. Additionally, in other implementations, the processing system 100 is structured in other ways than shown in FIG. 1. Also, components of the processing system 100 are implemented as hardware, circuitry, firmware, software, or any combination thereof. In some implementations, the processing system 100 includes one or more software, hardware, circuitry, and firmware components in addition to or different from those shown in FIG. 1.

In the depicted example, the processing system 100 includes a central processing unit (CPU) 102, an accelerator processing unit (also referred to herein as "accelerator processor 104" or "AP 104") 104, a device memory 106 utilized by the AP 104, and a system memory 108 shared by the CPU 102 and the AP 104. The AP 104 includes, for example, an individual or a plurality of a vector processor, a co-processor, a graphics processing unit (GPU), a general-purpose GPU (GPGPU), a non-scalar processor, a parallel processor, an artificial intelligence (AI) processor, an inference engine, a machine-learning processor, another multithreaded processing unit, a scalar processor, a serial processor, a programmable logic device (e.g., a simple programmable logic device, a complex programmable logic device, a field programmable gate array (FPGA), or any combination thereof). The AP 104 and the CPU 102, in at least some implementations, are formed and combined on a single silicon die or package to provide a unified programming and execution environment. In other implementations, the AP and the CPU 102 are formed separately and mounted on the same or different substrates. In at least some implementations, the AP 104 is a dedicated GPU, one or more GPUs including several devices, or one or more GPUs integrated into a larger device.

The memories 106, 108 include any of a variety of random access memories (RAMs) or combinations thereof, such as a double-data-rate dynamic random access memory (DDR DRAM), a graphics DDR DRAM (GDDR DRAM), and the like. The AP 104 communicates with the CPU 102, the device memory 106, and the system memory 108 via a communications infrastructure 110, such as a bus. The communications infrastructure 110 interconnects the components of the processing system 100 and includes one or more of a peripheral component interconnect (PCI) bus, extended PCI (PCI-E) bus, advanced microcontroller bus architecture (AMBA) bus, advanced graphics port (AGP), or other such communication infrastructure and interconnects. In some implementations, communications infrastructure 110 also includes an Ethernet network or any other suitable physical communications infrastructure that satisfies an application's data transfer rate requirements.

As illustrated, the CPU 102 includes a number of processes, such as executing one or more application(s) 112 to generate graphic commands and a user mode driver 116 (or other drivers, such as a kernel mode driver). In at least some implementations, the one or more applications 112 include applications that utilize the functionality of the AP 104. An application 112 may include one or more graphics instructions that instruct the AP 104 to render a graphical user interface (GUI) and/or a graphics scene. For example, the graphics instructions may include instructions that define a set of one or more graphics primitives to be rendered by AP 104.

In at least some implementations, the application 112 utilizes a graphics application programming interface (API) 114 to invoke a user mode driver 116 (or a similar GPU driver). The user mode driver 116 issues one or more commands to AP 104 for rendering one or more graphics primitives into displayable graphics images. Based on the graphics instructions issued by the application 112 to the user mode driver 116, the user mode driver 116 formulates one or more graphics commands that specify one or more operations for AP 104 to perform for rendering graphics. In at least some implementations, the user mode driver 116 is a part of the application 112 running on the CPU 102. In one example, the user mode driver 116 is part of a gaming application running on the CPU 102. Similarly, a kernel mode driver (not shown) may be part of an operating system running on the CPU 102. The graphics commands generated by the user mode driver 116 include graphics commands intended to generate an image or a frame for display. The user mode driver 116 translates standard code received from the API 114 into a native format of instructions understood by the AP 104. The user mode driver 116 is typically written by the manufacturer of the AP 104. Graphics commands generated by the user mode driver 116 are sent to AP 104 for execution. The AP 104 executes the graphics commands and uses the results to control what is displayed on a display screen.

In at least some implementations, the CPU 102 sends graphics commands, compute commands, or a combination thereof intended for the AP 104 to a command buffer 118. Although depicted in FIG. 1 as a separate component for ease of illustration, the command buffer 118, in at least some implementations, is located in device memory 106, system memory 108, or a separate memory coupled to the communication infrastructure 110. The command buffer 118 temporarily stores a stream of graphics commands that include input to the AP 104. The stream of graphics commands includes, for example, one or more command packets and/or one or more state update packets.

The AP 104, in at least some implementations, accepts both compute commands and graphics rendering commands from the CPU 102. The AP 104 includes any cooperating collection of hardware, software, or a combination thereof that performs functions and computations associated with accelerating graphics processing tasks, data-parallel tasks, nested data-parallel tasks in an accelerated manner with respect to resources such as conventional CPUs, conventional GPUs, and combinations thereof. For example, in at least some implementations, the AP 104 executes commands and programs for selected functions, such as graphics operations and other operations that are particularly suited for parallel processing. In general, the AP 104 is frequently used for executing graphics pipeline operations, such as pixel operations, geometric computations, and rendering an image to a display. In some implementations, the AP 104 also executes compute processing operations (e.g., those operations unrelated to graphics such as video operations, physics simulations, computational fluid dynamics, etc.), based on commands or instructions received from the CPU 102. For example, such commands include special instructions that are not typically defined in the instruction set architecture (ISA) of the AP 104. In some implementations, the AP 104 receives an image geometry representing a graphics image, along with one or more commands or instructions for rendering and displaying the image. In various implementations, the image geometry corresponds to a representation of a two-dimensional (2D) or three-dimensional (3D) computerized graphics image.

In various implementations, the AP 104 includes one or more processing units 120 (illustrated as processing unit 120-1 and processing unit 120-2). One example of a processing unit 120 is a workgroup processor (WGP) 120-2. In at least some implementations, a WGP 120-2 is part of a shader engine (not shown) of the AP 104. Each of the processing units 120 includes one or more compute units 122 (illustrated as compute unit 122-1 and compute unit 122-2), such as one or more stream processors (also referred to as arithmetic-logic units (ALUs) or shader cores), one or more single-instruction multiple-data (SIMD) units, one or more logical units, one or more scalar floating point units, one or more vector floating point units, one or more special-purpose processing units (e.g., inverse-square root units, since/cosine units, or the like), a combination thereof, or the like. Stream processors are the individual processing elements that execute shader or compute operations. Multiple stream processors are grouped together to form a compute unit or a SIMD unit. SIMD units, in at least some implementations, are each configured to execute a thread concurrently with execution of other threads in a wavefront (e.g., a collection of threads that are executed in parallel) by other SIMD units, e.g., according to a SIMD execution model. The SIMD execution model is one in which multiple processing elements share a single program control flow unit and program counter and thus execute the same program but are able to execute that program with different data. The number of processing units 120 implemented in the AP 104 is configurable. Each processing unit 120 includes one or more processing elements such as scalar and or vector floating-point units, arithmetic and logic units (ALUs), and the like. In various implementations, the processing units 120 also include special-purpose processing units (not shown), such as inverse-square root units and sine/cosine units.

Each of the one or more processing units 120 executes a respective instantiation of a particular work item to process incoming data, where the basic unit of execution in the one or more processing units 120 is a work item (e.g., a thread). Each work item represents a single instantiation of, for example, a collection of parallel executions of a kernel invoked on a device by a command that is to be executed in parallel. A work item executes at one or more processing elements as part of a workgroup executing at a processing unit 120.

The AP 104 issues and executes work-items, such as groups of threads executed simultaneously as a "wavefront", on a single SIMD unit. Wavefronts, in at least some implementations, are interchangeably referred to as warps, vectors, or threads. In some implementations, wavefronts include instances of parallel execution of a shader program, where each wavefront includes multiple work items that execute simultaneously on a single SIMD unit in line with the SIMD paradigm (e.g., one instruction control unit executing the same stream of instructions with multiple data). A hardware scheduler (HWS) 124 is configured to perform operations related to scheduling various wavefronts on different processing units 120 and compute units 122, and performing other operations to orchestrate various tasks on the AP 104. In at least some implementations, the HWS 124 is implemented using one or more of hardware components, circuitry, firmware or a firmware-controlled microcontroller, or a combination thereof. The HWS 124, in at least some implementations, includes components such as one or more command processors, dispatch units, queue managers, load balancers, resource trackers, hardware timers and counters, priority handling components, interrupt handlers, power management controllers, a combination thereof or the like.

In at least some implementations, the processing system 100 also includes one or more command processors 126 that act as an interface between the CPU 102 and the AP 104. The command processor 126 receives commands from the CPU 102 and pushes the commands into the appropriate queues or pipelines for execution. The hardware scheduler 124 schedules the queued commands, also referred to herein as work items 134 (e.g., a task, a thread, a wavefront, a warp, an instruction, or the like), for execution on the appropriate resources, such as the compute units 122, within the AP 104. In at least some implementations, the hardware scheduler 124 and the command processor 126 are separate components, whereas, in other implementations, the hardware scheduler 124 and the command processor 126 are the same component. Also, in at least some implementations, one or more of the processing units 120 include additional schedulers. For example, a WGP 120-2, in at least some implementations, includes a local scheduler (not shown) that, among other things, allocates work items to the compute units 122-2 of the WGP 120-2.

In at least some implementations, the AP 104 includes a memory cache hierarchy (not shown) including, for example, L1 cache and a local data share (LDS), to reduce latency associated with off-chip memory access. The LDS is a high-speed, low-latency memory private to each processing unit 120. In some implementations, the LDS is a full gather/scatter model so that a workgroup writes anywhere in an allocated space.

The parallelism afforded by the one or more processing units 120 is suitable for graphics-related operations such as pixel value calculations, vertex transformations, tessellation, geometry shading operations, and other graphics operations. A graphics processing pipeline 128 accepts graphics processing commands from the CPU 102 and thus provides computation tasks to the one or more processing units 120 for execution in parallel. In at least some implementations, the graphics pipeline 128 includes a number of stages 130, including stage A 130-1, stage B 130-2, and through stage N 130-N, each configured to execute various aspects of a graphics command. Some graphics pipeline operations, such as pixel processing and other parallel computation operations, require that the same command stream or compute kernel be performed on streams or collections of input data elements. Respective instantiations of the same compute kernel are executed concurrently on multiple compute units 122 in the one or more processing units 120 to process such data elements in parallel. As referred to herein, for example, a compute kernel is a function containing instructions declared in a program and executed on a processing unit 120 of the AP 104. This function is also referred to as a kernel, a shader, a shader program, or a program.

The processing system 100 also includes one or more software-managed data structures (DSs) 132 (illustrated as DS 132-1, DS 132-2, and DS 132-3), which are organizational schemes that allow for the efficient manipulation, storage, and access of data. It should be understood that the processing system 100, in at least some implementations, also includes other types of data structures, such as hardware-managed data structures. In at least some implementations, DSs 132 are maintained within one or more levels of the memory hierarchy of the processing system 100, such as the device memory 106, the system memory 108, cache, a combination thereof, or the like.

Examples of software-managed DSs 132 include buffers, linked lists, hash tables, or the like. A software-managed buffer is a region of memory that is explicitly allocated and managed by software for the temporary storage of data. One example of a buffer is a ring buffer (or circular buffer), which is a fixed-size data structure that uses a single, contiguous block of memory to store multiple elements. When the ring buffer fills up, the insertion index wraps around to the start of the buffer, effectively making it circular in nature. A ring buffer has two indices, typically referred to as the read index and the write index. The read index points to where the next element will be read or removed and the write index points to where a new element will be inserted. Operations typically performed on a ring buffer include a write or push operation and a read or pop operation. A write (or push) operation for a ring buffer adds an element at the write index and then increments the write index. If the buffer is full and the write index has caught up with the read index, the write either fails, overwrites the oldest data, or blocks until space is available, depending on the implementation. A read (or pop) operation reads an element at the read index and then increments the read index. If the buffer is empty and the read index has caught up with the write index, the read either fails or blocks until data is available, again depending on the implementation.

A linked list is a data structure used to organize elements in a linear order. Unlike arrays, which allocate a contiguous block of memory for the entire structure, linked lists allocate memory for each element separately as the list grows. Each element in a linked list is generally referred to as a "node", and each node has two main components, a data field and a next-pointer field. The data field holds the actual value of the element and is able to store various data types, including objects or even other data structures. The next-pointer field is the address or reference to the next node in the sequence. The first node in the linked list is typically referred to as the "head" and points to the first element in the list. The last node in the linked list is typically referred to as the "tail" and points to a null reference, indicating the end of the list. There are various types of linked lists, such as a singly-linked, a doubly-linked list, and a circular linked list. In a singly-linked list, each node points only to the next node in the sequence and allows for forward traversal only. In a doubly-linked list, each node points to both the next node and the previous node in the sequence, and allows for both forward and backward traversal. A double-linked list has an additional field, referred to as the previous-pointer field, that is address or reference to the previous node in the sequence. In a circular linked list, the last node of the list points back to the first node instead of having a null reference. Operations that can be performed on a linked list include insertion, deletion, and traversal. An insertion operation adds a new node to the list at either the beginning, end, or any position in the list. A deletion operation removes a node from the list, which involves adjusting the next-pointer fields (and possibly the previous-pointer fields) of the adjacent nodes and deallocating the memory used by the node to be deleted. A traversal operation moves through the list to perform operations such as searching or modifications to the data or structure of the linked list.

A hash table is a data structure typically used to implement associative arrays, sets, caches, and other data storage and retrieval operations. The components of a hash table include an array-like storage, a hash function, and keys and values. The foundational structure of a hash table is an array, where each element (referred to as a "bucket" or "slot") holds one or more key-value pairs. The size of this array can dynamically increase or decrease depending on the number of elements in the hash table. The hash function is a function that takes a key as input and outputs an integer value. This integer is then used to determine the index at which the corresponding key-value pair should be stored in the array of buckets. The keys and values are the actual data stored in the hash table. Each key is unique and is used to identify its corresponding value. Operations that can be performed on a hash table include insertion, deletion, lookup, and rehashing. An insertion operation inserts a new key-value pair into the hash table by using the hash function to determine the appropriate bucket index. The insertion operation then places the key-value pair in that bucket. If a collision occurs, a collision resolution strategy can be utilized to resolve the collision. A deletion operation deletes a key-value pair from the hash table by using the hash function to find the appropriate bucket and then removing the key-value pair from that bucket. A lookup operation retrieves the value associated with a particular key by using the hash function to find the appropriate bucket and retrieving the value from that bucket. A rehashing operation resizes the hash table when the table becomes too full or too empty by rehashing all existing keys to new positions in the resized array.

As indicated above, the efficient operation of a processing unit in a computing system is dependent on its ability to quickly access and manipulate data stored in data structures. However, conventional techniques typically require a work item 134 (e.g., a task, thread, wavefront, warp, instruction, or the like) of a program to either perform atomic operations or obtain locks, which are resource-intensive and computationally expensive, when accessing software-managed data structures to avoid race conditions. Therefore, in at least some implementations, the processing system 100 includes one or more hardware units 136, which are herein referred to as "complex compound atomic hardware units (CCAUs) 136" or "accelerated access circuits 136" and illustrated as CCAU 136-1 to CCAU 136-3, that accelerate access to the DSs 132 such that a work item 134 of a program is no longer required to perform atomic operations or obtain locks to access the DSs 132. In at least some implementations, the CCAUs 136 is implemented using one or more of hardware components, circuitry, firmware or a firmware-controlled microcontroller, or a combination thereof.

In at least some implementations, one or more CCAUs 136 are situated in the CPU 102, the AP 104, a processing unit 120 such as a WGP 120-2, or any other application location within the processing system 100. Each of the DSs 132 is bound to one of the CCAUs 136 and each of the CCAUs 136 is bound to one or more of the DSs 132. Stated differently, a DS 132 has a one-to-one mapping with the CCAUs 136, whereas a CCAU 136 has a one-to-N mapping with the DSs 132 where N is greater than or equal to 1. In some implementations, a DS 132 is implemented external to the CCAU 136 bound to the DS 132. In other implementations, a DS 132 is implemented internally within the CCAU 136 bound to the DS 132.

Figure 2:
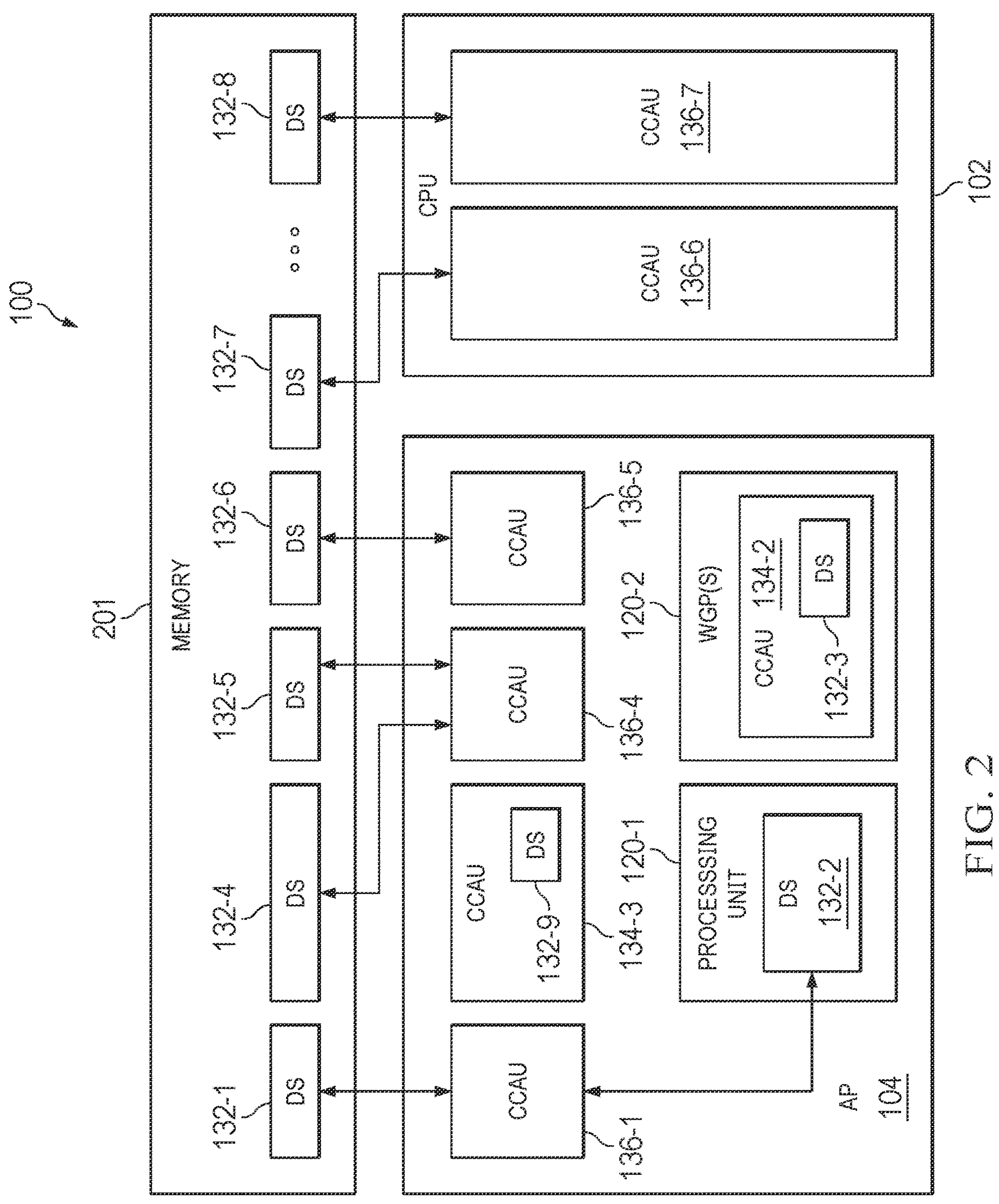
FIG. 2 is a block diagram illustrating an example of binding software-managed data structures to complex compound atomic hardware units implemented in the processing system of FIG. 1 in accordance with some implementations.

FIG. 2 shows one example of DSs 132 (illustrated as DS 132-1 to DS 132-9) bound to CCAUs 136 (illustrated as CCAU 136-1 to CCAU 136-7). In this example, a memory 201 (e.g., device memory 106, system memory 108, or cache) of the processing system 100 includes one or more DSs 132. Each of the DSs 132 in the memory 201 is bound to a single instance of a CCAU 136. In at least some implementations, one or more CCAUs 136 are bound to multiple DSs 132. For example, FIG. 2 shows that CCAU 136-1 is bound to DS 132-1 and DS 132-2 and CCAU 136-4 is bound to DS 132-4 and DS 132-5. In this example, DS 132-2 is a DS that is maintained within a processing unit 120. FIG. 2 (and FIG. 1) further show that, in at least some implementations, one or more DSs 132 are maintained in a CCAU 136. For example, FIG. 2 shows that DS 132-3 is maintained in and bound to CCAU 136-2, which is situated in a processing unit 120, such as a WGP 120-2 or other type of processing unit 120, and DS 132-9 is maintained in and bound to CCAU 136-3, which is an independent component within the AP 104.

In at least some implementations, various mechanisms can be used to bind a DS 132 to a CCAU 136. For example, a DS 132 is bound to a specified CCAU 136 by configuring the hardware scheduler 124 (or a local scheduler of a processing unit 120) to issue work items 134 (e.g., tasks, threads, or instructions) that are requesting the DS 132 only to the CCAU 136 associated with the DS 132. Also, implementing a DS 132 within a CCAU 136 also binds the DS 132 to that CCAU 136. In at least some implementations, a hierarchical connection is used to connect CCAUs 136 to one or more DSs 132. For example, one or more CCAUs 136 are connected/coupled to another CCAU 136, which is connected to one or more DSs 132.

Figure 3:
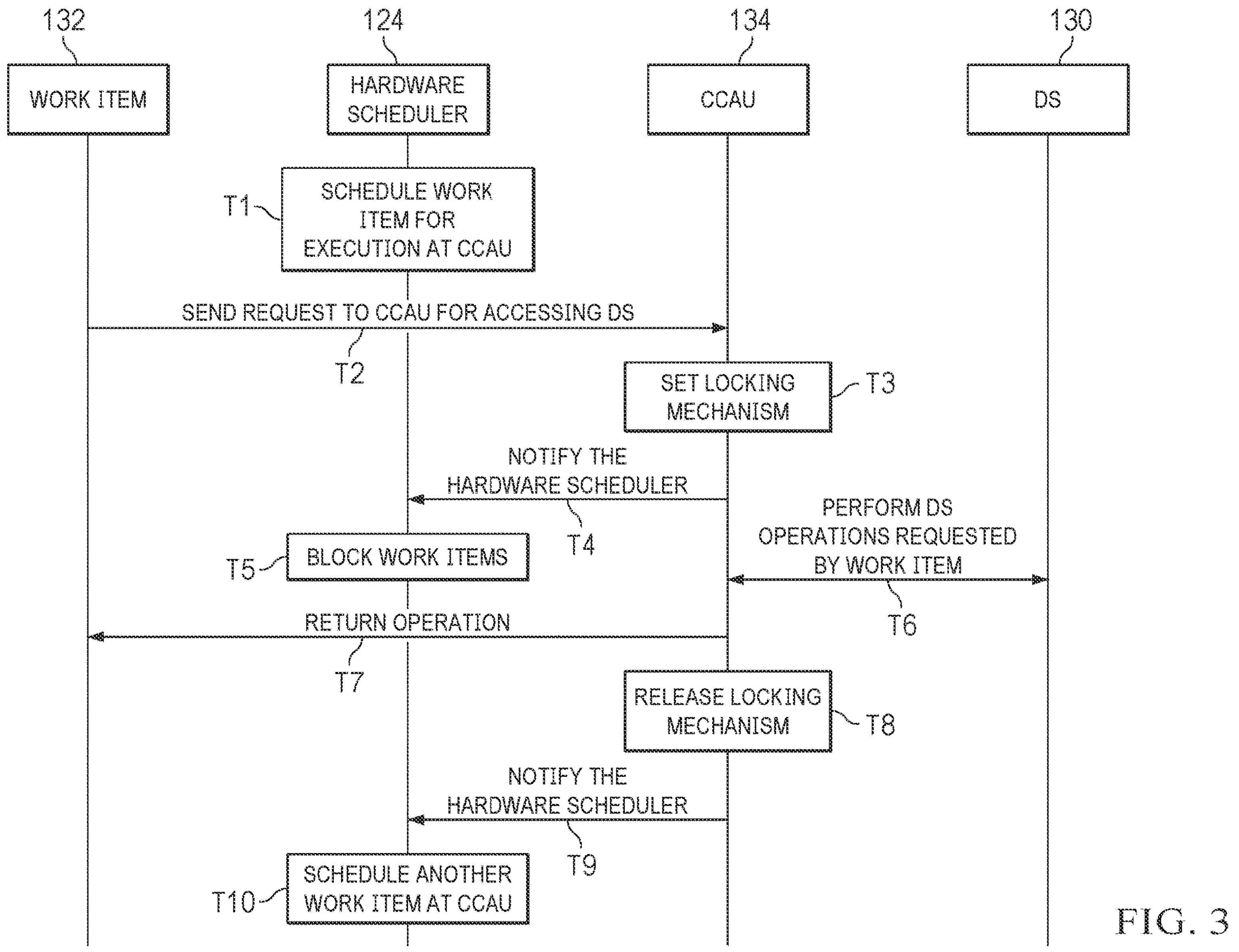
FIG. 3 is a timing diagram illustrating an example sequence of operations for implementing hardware-accelerated access to software-managed data structures in accordance with some implementations.
Figure 4:
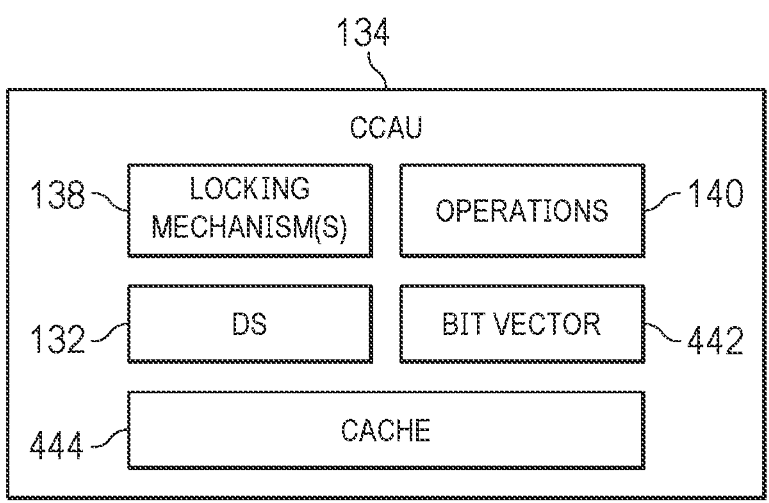
FIG. 4 is a block diagram of an example complex compound atomic hardware unit implemented in the processing system of FIG. 1.

The CCAU 136 accelerates access to a DS 132 bound to the CCAU 136 by providing a work item 134 access to the DS 132 without having to perform atomic operations or obtain a lock. In at least some implementations, the CCAU 136 accomplishes this accelerated access by rate limiting and serializing a work item's access to a bound DS 132, which removes the burden of performing atomic operations and obtaining locks from the work items 134. FIG. 3 shows a timing diagram illustrating one example of the hardware acceleration process performed by the CCAU 136. It should be understood that one or more of the time intervals (T) shown in FIG. 3 occur either in a single clock cycle or across multiple clock cycles. It should also be understood that, in at least some implementations, two or more of the processes shown in FIG. 4 are performed concurrently or in parallel. Also, rather than the (global) hardware scheduler 124 performing one or more processes described below, a local scheduler within or associated with a compute unit 120 is able to perform these processes.

In the illustrated example, at T1, when a work item 134 requires access to a DS 132, the hardware scheduler 124 schedules the work item 134 for execution on or by the CCAU 136. At T2, the scheduled work item 134 issues a request to the CCAU 136 for accessing the DS 132 bound to the CCAU 136. In at least some implementations, the request encapsulates one or more commands or instructions that the work item 134 is requesting to be performed on the DS 132. The CCAU 136, in at least some implementations, includes an internal locking or serialization mechanism 138 (FIG. 1). At T3, when the CCAU 136 receives the request from the work item 134, the CCAU 136 sets the locking mechanism 138. In at least some implementations, the CCAU 136 sets the locking mechanism by changing the state of a variable representing the locking mechanism, which is stored in the CCAU 136, device memory 106, system memory 108, or the like. For example, the CCAU 136 changes the state of the variable from "0" (unlocked) to "1" (locked) when locking the DS 132 bound to the CCAU 136. However other methods for setting the locking mechanism 138 are also applicable. In at least some implementations, the locking mechanism 138 is not implemented and the CCAU 136 pipelines work items 134 such that their requested operations are performed in a serialized manner.

At T4, the CCAU 136 notifies the hardware scheduler 124 that a lock has been set (or obtained). This lock notification indicates to the hardware scheduler 124 that the CCAU 136 is currently busy. In at least some implementations, the CCAU 136 notifies the hardware scheduler 124 that the locking mechanism 138 has been set using one or more notification mechanisms, such as setting status flags or registers accessible by the hardware scheduler 124, generating one or more interrupts or signals, a combination thereof, or the like. At T5, the hardware scheduler 124 refrains from scheduling any additional work items 134 at the CCAU 136 until the lock is released. Stated differently, additional work items 134 are blocked from accessing the CCAU 136 and the bound DS 132 until the lock is released. As such, the CCAU 136, in at least some implementations, utilizes the locking mechanism 138 to rate limit the work items 134. In at least some implementations, the hardware scheduler 124 utilizes, for example, a resource allocation table, status flags, registers, or another mechanism to track the current busy status of the CCAU 136. For example, when the hardware scheduler 124 receives the lock notification from the CCAU 136, the hardware scheduler 124 updates a resource allocation table to indicate that the CCAU 136 is currently busy.

At T6, after the CCAU 136 sets the locking mechanism 138, the CCAU 136 performs operations 140 (FIG. 1) requested by the work item 134 on the DS 132 in a serialized or atomic manner. Stated differently, the operations 140 requested by the work item 134 are executed and completed by the CCAU 136 before another work item 134 is allowed access to the CCAU 136 and DS 132. In at least some implementations, the CCAU 136 is configured to perform a set of operations 140 associated with the type of DS(s) 132 bound to the CCAU 136. For example, if a DS 132 bound to the CCAU 136 is a ring buffer, the CCAU 136 is configured to perform, for example, write/push and read/pop operations on the DS 132. If a DS 132 bound to the CCAU 136 is a linked list, the CCAU 136 is configured to perform, for example, insertion, deletion, and traversal operations on the DS 132. If a DS 132 bound to the CCAU 136 is a hash table, the CCAU 136 is configured to perform, for example, insertion, deletion, lookup, and rehashing operations on the DS 132.

The CCAU 136, in at least some implementations, is configured to execute operations associated with a single type of DS 132. In other implementations, the CCAU 136 is configured to execute operations associated with a plurality of different types of DSs 132. For example, in implementations where the CCAU 136 is bound to either a single internal DS 132, a single external DS 132, or multiple DSs 132 of the same type, the CCAU 136 is configured to execute operations for that DS 132 (or type of DS). However, in implementations where the CCAU 136 is bound to multiple internal DSs 132 of different types, multiple external DSs 132 of different types, or a combination thereof, the CCAU 136 is configured to execute multiple different sets of operations. For example, if the CCAU 136 is bound to a ring buffer and a hash table, the CCAU 136 is configured to perform, for example, write/push and read/pop operations for the ring buffer and insertion, deletion, lookup, and rehashing operations for the hash table. In these implementations, the CCAU selectively performs a set of operations 140 based on the type of DS 132 being accessed and the request received from the work item 134. In at least some implementations, the CCAU 136 completes the operations 140 within one clock cycle or multiple clock cycles.

At T7, after the CCAU 136 has completed executing the operations 140 on the DS 132, the CCAU 136 performs a return operation that returns data from the DS 132 to the work item 134, sends a notification to the work item 134 that the requested operations have been completed, or a combination thereof depending on the request received from the work item 134. In at least some implementations, the CCAU 136 performs the return operation using one or more return paths, such as direct memory access (DMA) writes, hardware registers, message queues, interrupts, shared memory writes, status flags, callbacks, a combination thereof, or the like. At T8, the CCAU 136 releases or resets its locking mechanism 138. At T9, the CCAU 136 notifies the hardware scheduler 124 that the lock has been released. At T10, in response to receiving this notification from the CCAU 136, the hardware scheduler 124 selects and schedules another work item 134 to access the CCAU 136 and its bound DS 132.

As shown in FIG. 4, the CCAU 136, in at least some implementations, includes a bit vector 442 that has as many bits as the DS 132 has capacity. The bit vector 442, in at least some implementations, acts as an occupancy table for the DS 132. When performing an insertion or enqueue operation on the DS 132, the CCAU 136 is able to perform different processes selectively. For example, when accessing a larger DS 132 where a scan across all bits of the DS 132 takes multiple cycles, the CCAU 136 uses a cache 444 to the last freed slot of the DS 132, which is updated on a dequeue operation (also referred to as a "pop" or "read" operation). Otherwise, the CCAU 136 performs a scan over the DS 132 to find the first 0 bit. When the CCAU 136 finds the empty slot (i.e., a slot with a 0 bit in the bit vector 442), the CCAU 136 automatically sets the bit to "1" and returns the slot number to the work item 134. This atomicity does not require locks since the CCAU 136, in this example, is rate limited to one operation every M clock cycles, with M being the worst-case time it takes to execute. When performing a deletion or dequeue operation on the DS 132, the CCAU 136 either releases the next bit or releases a specific set. In at least some implementations, a cache similar to the cache 444 implemented for an insertion operation is utilized by the CCAU 136 for the deletion operation.

In at least some implementations, the CCAU 136 is scaled by multi-cycling the CCAU 136 based on the number of bits for the DS 132. The CCAU 136, in at least some implementations, is configured to allow for multiple parallel requests by partitioning the bit vector 442. For example, if a 256 slot DS 132 is implemented and is being accessed by eight processing units 120, each processing unit 120 first accesses its associated 32-bit sub-vector in parallel, and only if that fails to return a result a sequential search of the DS 132 is performed. This configuration allows the DS 132 to scale in two dimensions, i.e., the number of bits (by making the DS 132 multiple levels deep or taking more sequential cycles) and the number of parallel access ports.

Figure 5:
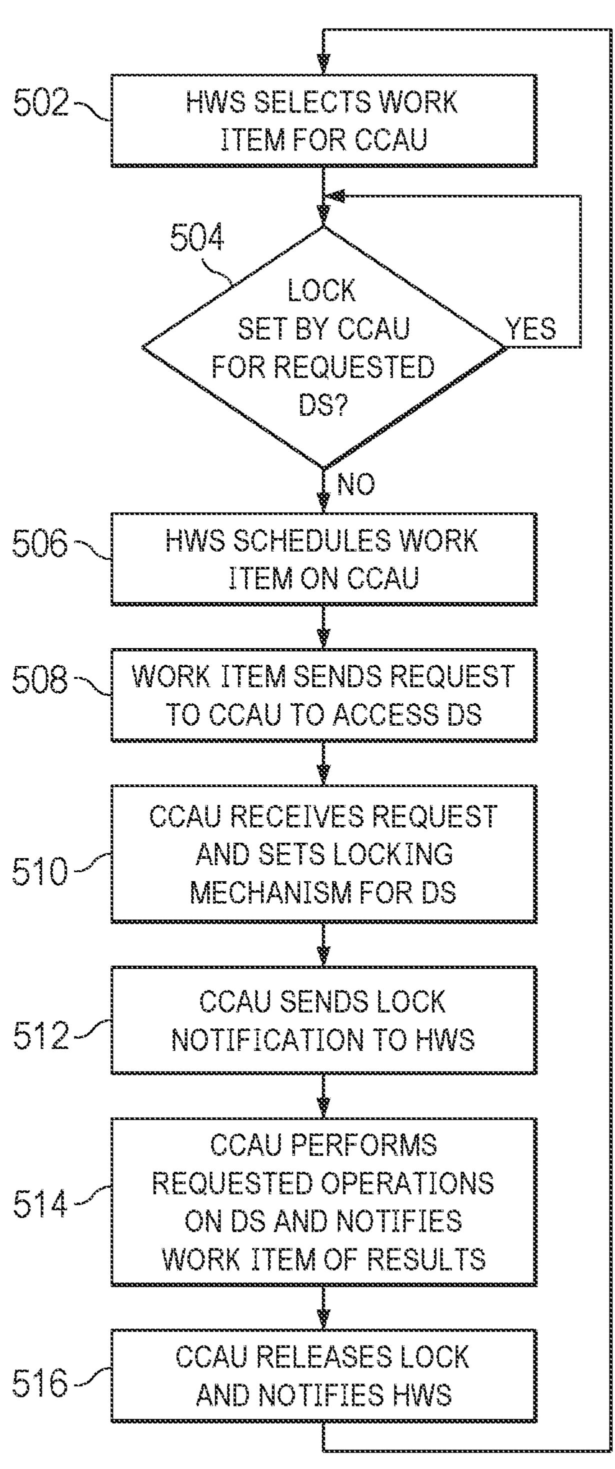
FIG. 5 is a flow diagram illustrating an example method for accelerating access to software-managed data structures using complex compound atomic hardware units in accordance with at least some implementations.

FIG. 5 is a diagram illustrating an example method 500 of accelerating access to software-managed data structures 132 using a CCAU 136 in accordance with at least some implementations. It should be understood that the processes described below with respect to method 500 have been described above in greater detail with reference to FIG. 1 to FIG. 4. For purposes of description, the method 500 is described with respect to an example implementation at the processing system 100 of FIG. 1, but it will be appreciated that, in other implementations, the method 500 is implemented at processing devices having different configurations. Also, the method 500 is not limited to the sequence of operations shown in FIG. 5, as at least some of the operations can be performed in parallel or in a different sequence. Moreover, in at least some implementations, the method 500 can include one or more different operations than those shown in FIG. 5.

At block 502, the hardware scheduler 124 selects from the command buffer 118 (or another location) a work item 134 requesting access to a software-managed DS 132. At block 504, the hardware scheduler 124 determines if the CCAU 136 bound to the DS 132 is currently busy. In at least some implementations, the hardware scheduler 124 identifies the CCAU 136 bound to the DS 132 by, for example, searching a table maintained by the hardware scheduler 124 that indicates which DSs 132 are bound to which CCAUs 136. Other mechanisms, such as registers, can also be implemented to track the mapping between DSs 132 and CCAUs 136. When the hardware scheduler 124 identifies the CCAU 136 bound to the DS 132, the hardware scheduler 124 checks the same or different table, register, or the like to determine if the CCAU 136 is currently busy (i.e., the CCAU 136 is currently accessing the requested DS 132).

If the CCAU 136 is busy, the hardware scheduler 124 waits until the CCAU 136 indicates that it is free to schedule the work item 134 on the CCAU 136. At block 506, if the CCAU 136 is not busy, the hardware scheduler 124 schedules the work item 134 on the CCAU 136. At block 508, the scheduled work item 134 issues a request to the CCAU 136 for accessing the DS 132 bound to the CCAU 136. In at least some implementations, the request encapsulates one or more commands or instructions that the work item 134 is requesting to be performed on the DS 132. At block 510, the CCAU 136 receives the request from the work item 134 and sets the locking mechanism 138 for the DS 132. At block 512, the CCAU 136 notifies the hardware scheduler 124 that the lock for the DS 132 has been set, which configures the hardware scheduler 124 to refrain from scheduling any subsequent work items 134 on the CCAU 136. However, if the CCAU 136 is bound to multiple DS 132, the hardware scheduler 124, in at least some implementations, is able to schedule another work item 134 on the CCAU 136 to access a different DS 132.

At block 514, the CCAU 136 performs operations 140 requested by the work item 134 on the DS 132 in a serialized or atomic manner and notifies the work item 134 of the results. For example, the CCAU performs a return operation that returns data from the DS 132 to the work item 134, sends a notification to the work item 134 that the requested operations have been completed, or a combination thereof depending on the request received from the work item 134. At block 516, the CCAU resets the locking mechanism 138 and notifies the hardware scheduler 124 that the lock for the DS 132 has been released. This notification indicates to the hardware scheduler 124 that another work item 134 is able to be sent to the CCAU 136 to access the DS 132. The method 500 then returns to block 502.

As such, the CCAU 136 accelerates access to software-managed data structures, such as buffers, linked lists, and hash tables, by removing the need for work items to acquire locks or perform atomic operations. For example, instead of the work items having to perform atomic operations or obtain and release locks, which can be computationally expensive, to access a software-managed data structure, the work items only need to send a request to the CCAU 136. When the CCAU 136 receives a request from a work item 134 to access a DS 132 bound to the CCAU 136, the CCAU 136 serializes access to the DS 132 by blocking any other work items 134 from accessing the DS 132. The CCAU 136 then performs the requested operations 140 on the DS 132 in a serialized or atomic manner.

One or more of the elements described above is circuitry designed and configured to perform the corresponding operations described above. Such circuitry, in at least some implementations, is any one of, or a combination of, a hardcoded circuit (e.g., a corresponding portion of an application-specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD)), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations.

Within this disclosure, in some cases, different entities (which are variously referred to as "components", "units", "devices", "circuitry", etc.) are described or claimed as "configured" to perform one or more tasks or operations. This formulation of [entity] configured to [perform one or more tasks] is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to". An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A processor, comprising:

an accelerated access circuit;

a data structure managed by software; and a hardware scheduling circuit configured to schedule, on the accelerated access circuit, a work item requesting access to the data structure, wherein the accelerated access circuit is configured to:

receive a request from the work item to access the data structure; and responsive to the request, enforce exclusive access to the data structure at the accelerated access circuit by blocking any other work item from being scheduled to access the data structure until the requested access completes.

2. The processor of claim 1, wherein the data structure is bound to the accelerated access circuit.

3. The processor of claim 1, wherein the accelerated access circuit is configured to enforce exclusive access by serializing access to the data structure, including:

configuring the hardware scheduling circuit to refrain from scheduling, on the accelerated access circuit, additional work items requesting access to the data structure.

4. The processor of claim 3, wherein the accelerated access circuit is further configured to:

responsive to the requested access having completed, configure the hardware scheduling circuit to schedule, on the accelerated access circuit, another work item requesting access to the data structure.

5. The processor of claim 1, wherein the accelerated access circuit is configured to enforce exclusive access by serializing access to the data structure, including:

setting a locking mechanism associated with the data structure.

6. The processor of claim 5, wherein the locking mechanism is internal to the accelerated access circuit.

7. The processor of claim 5, wherein the accelerated access circuit is further configured to:

responsive to the access having completed, resetting the locking mechanism associated with the data structure.

8. The processor of claim 1, wherein the accelerated access circuit is configured to enforce exclusive access by serializing access to the data structure, including:

performing one or more operations on the data structure indicated by the request.

9. The processor of claim 8, wherein the accelerated access circuit is further configured to:

return results of the one or more operations to the work item.

10. The processor of claim 1, wherein the data structure is only accessible by the accelerated access circuit.

11. The processor of claim 1, wherein the accelerated access circuit is bound to a plurality of data structures managed by software.

12. A method, comprising:

receiving, by an accelerated access circuit in a processing system, a request from a work item generated by a processor of the processing system to access a data structure managed by software; and responsive to the request, enforcing, by the accelerated access circuit, exclusive access to the data structure at the accelerated access circuit by blocking any other work item from being scheduled to access the data structure until the requested access completes.

13. The method of claim 12, wherein enforcing exclusive access comprises serializing access to the data structure by:

configuring, by the accelerated access circuit, a hardware scheduling circuit of the processing system to refrain from scheduling, on the accelerated access circuit, additional work items requesting access to the data structure.

14. The method of claim 13, wherein responsive to the requested access having completed, configuring, by the accelerated access circuit, the hardware scheduling circuit to schedule, on the accelerated access circuit, another work item requesting access to the data structure.

15. The method of claim 12, wherein enforcing exclusive access comprises serializing access to the data structure by:

setting, by the accelerated access circuit, a locking mechanism associated with the data structure.

16. The method of claim 15, wherein responsive to the access having completed, resetting, by the accelerated access circuit, the locking mechanism associated with the data structure.

17. The method of claim 12, wherein enforcing exclusive access comprises serializing access to the data structure by:

performing, by the accelerated access circuit, one or more operations on the data structure indicated by the request.

18. The method of claim 12, further comprising:

binding the data structure only to the accelerated access circuit.

19. The method of claim 12, further comprising:

binding the accelerated access circuit to a plurality of data structures managed by software.

20. A processor, comprising:

at least one compute unit comprising an accelerated access circuit;

a data structure managed by software and maintained within the accelerated access circuit, wherein the data structure is only accessible through the accelerated access circuit; and a hardware scheduling circuit configured to schedule, on the accelerated access circuit, a work item requesting access to the data structure, wherein the accelerated access circuit is configured to:

receive a request from the work item to access the data structure; and responsive to the request, enforce exclusive access to the data structure at the accelerated access circuit by blocking any other work item from being scheduled to access the data structure until the requested access completes.

* * * * *